United States Patent
Shah et al.

(10) Patent No.: US 12,443,514 B2
(45) Date of Patent: Oct. 14, 2025

(54) TESTING FOR TASKS ASSOCIATED WITH A CLOUD COMPUTING SERVERLESS FUNCTION

(71) Applicant: Capital One Services, LLC, McLean, VA (US)

(72) Inventors: Rumil Shah, Glen Allen, VA (US); Narahari Shettyhalli Shankarnarayana, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 208 days.

(21) Appl. No.: 18/299,988

(22) Filed: Apr. 13, 2023

(65) Prior Publication Data

US 2024/0345939 A1     Oct. 17, 2024

(51) Int. Cl.
    *G06F 11/3668* (2025.01)
(52) U.S. Cl.
    CPC ...... *G06F 11/3684* (2013.01); *G06F 11/3688* (2013.01)
(58) Field of Classification Search
    CPC .......................... G06F 11/3684; G06F 11/3688
    USPC ....................................................... 717/124
    See application file for complete search history.

(56) References Cited

U.S. PATENT DOCUMENTS

| | | | |
|---|---|---|---|
| 10,372,600 B2 * | 8/2019 | Mathur | G06F 11/32 |
| 10,732,962 B1 * | 8/2020 | Florescu | G06F 11/0706 |
| 10,733,071 B2 * | 8/2020 | Gomes | G06F 11/3692 |
| 10,983,789 B2 * | 4/2021 | Muddakkagari | G06F 16/901 |
| 11,416,379 B1 * | 8/2022 | Petrescu | G06F 8/60 |
| 11,442,847 B2 * | 9/2022 | Mukhopadhyay | G06F 11/302 |
| 11,520,688 B1 * | 12/2022 | Poirier | G06F 11/3684 |
| 11,681,445 B2 * | 6/2023 | Vohra | G06N 3/08 711/163 |
| 12,056,042 B2 * | 8/2024 | Shrikant Patwardhan | G06F 11/368 |

(Continued)

FOREIGN PATENT DOCUMENTS

| | | | |
|---|---|---|---|
| CN | 111459795 A | * | 7/2020 |
| CN | 112148610 A | * | 12/2020 |

(Continued)

OTHER PUBLICATIONS

Rinta-Jaskari, Eetu, et al. "Testing approaches and tools for AWS lambda serverless-based applications." 2022 IEEE International Conference on Pervasive Computing and Communications Workshops and other Affiliated Events (PerCom Workshops). IEEE, 2022.*

*Primary Examiner* — Francisco J Aponte
(74) *Attorney, Agent, or Firm* — Harrity & Harrity, LLP

(57) ABSTRACT

In some implementations, a device may generate test data associated with the task that is configured to be performed by a serverless function in a cloud computing environment, where the test data simulates task data associated with a stream of data that is used by the serverless function to perform the task. The device may configure the test data with one or more configuration parameters that are based on an event type associated with an event that is associated with the test, or a data type of data associated with the task. The device may provide, to another stream of data, the test data configured with the one or more configuration parameters. The device may cause, based on providing the test data, the test to be performed based on one or more actions performed by the serverless function using the test data.

20 Claims, 7 Drawing Sheets

(56) References Cited

U.S. PATENT DOCUMENTS

| | | | | |
|---|---|---|---|---|
| 12,135,631 B2* | 11/2024 | Jothiprakash | ............ | G06F 9/547 |
| 12,174,732 B2* | 12/2024 | Walker | ................ | G06F 11/3692 |
| 2018/0095869 A1* | 4/2018 | Peer | .................... | G06F 11/3664 |
| 2018/0113791 A1* | 4/2018 | Fink | ........................ | G06F 11/362 |
| 2018/0285246 A1* | 10/2018 | Tuttle | .................. | G06F 11/3664 |
| 2019/0310931 A1* | 10/2019 | Ocariza, Jr. | .......... | G06F 11/3466 |
| 2020/0012588 A1* | 1/2020 | Gomes | ................ | G06F 11/3698 |
| 2020/0073783 A1* | 3/2020 | Hortala | ..................... | G06F 9/54 |
| 2020/0133829 A1* | 4/2020 | Zazo | ..................... | G06F 11/3692 |
| 2020/0285568 A1* | 9/2020 | Alff | ...................... | G06F 11/3696 |
| 2020/0379895 A1* | 12/2020 | Khandelwal | ........ | G06F 11/3664 |
| 2022/0100636 A1* | 3/2022 | Jothiprakash | ....... | G06F 11/3612 |
| 2023/0023876 A1* | 1/2023 | Brzóska | .................... | G06F 9/48 |
| 2023/0297496 A1* | 9/2023 | Shrikant | ............. | G06F 11/3688 |
| | | | | 717/124 |
| 2023/0350793 A1* | 11/2023 | Ceravolo | ............ | G06F 11/3664 |

FOREIGN PATENT DOCUMENTS

| | | | | | |
|---|---|---|---|---|---|
| CN | 114385475 A | * | 4/2022 | .......... | G06F 11/3684 |
| CN | 116795552 A | * | 9/2023 | .......... | G06F 11/3688 |

* cited by examiner

TESTING FOR TASKS ASSOCIATED WITH A CLOUD COMPUTING SERVERLESS FUNCTION

BACKGROUND

Cloud computing is a model for delivering computing resources over a network. Cloud computing environments allow devices to access shared pools of configurable computing resources, such as servers, storage, and applications, on-demand, without the need for direct management or ownership of the underlying infrastructure. Cloud computing environments may be associated with a variety of services, such as infrastructure-as-a-service (IaaS), platform-as-a-service (PaaS), and/or software-as-a-service (SaaS), among other examples.

SUMMARY

Some implementations described herein relate to a system for a generation and performance of a test for tasks associated with a serverless function. The system may include one or more memories and one or more processors communicatively coupled to the one or more memories. The one or more processors may be configured to obtain test data associated with a task that is configured to be performed by the serverless function included in a cloud computing environment, wherein the task is performable via task data obtained via a shared stream of data, and wherein the test data is obtained via a dedicated stream of data associated with testing that is associated with the task. The one or more processors may be configured to configure the test data with one or more configuration parameters, wherein the one or more configuration parameters are based on at least one of a test type associated with the test, an event type associated with an event that is associated with the test, or a data type of data associated with the task. The one or more processors may be configured to provide, to the dedicated stream of data, the test data configured with the one or more configuration parameters to cause the test to be performed by the serverless function using the test data.

Some implementations described herein relate to a method for a generation and performance of a test for a task associated with an anonymous function. The method may include generating, by a device, test data associated with the task, wherein the task is configured to be performed by the anonymous function in a cloud computing environment, wherein the test data is associated with a first stream of data associated with testing the task, and wherein the test data simulates task data associated with a second stream of data that is used by the anonymous function to perform the task. The method may include configuring, by the device, the test data with one or more configuration parameters that are based on an event type associated with an event that is associated with the test, or a data type of data associated with the task. The method may include providing, by the device and to the first stream of data, the test data configured with the one or more configuration parameters. The method may include causing, by the device and based on providing the test data, the test to be performed based on one or more actions performed by the anonymous function using the test data.

Some implementations described herein relate to a non-transitory computer-readable medium that stores a set of instructions. The set of instructions, when executed by one or more processors of a device, may cause the device to generate test data associated with a task that is configured to be performed by a lambda function in a cloud computing environment, wherein the test data is associated with a first stream of data dedicated to testing associated with the task, and wherein the test data simulates task data associated with a second stream of data that is used by the lambda function to perform the task. The set of instructions, when executed by one or more processors of the device, may cause the device to configure the test data with one or more configuration parameters that are based on an event type associated with an event that is associated with a test or a data type of data associated with the task. The set of instructions, when executed by one or more processors of the device, may cause the device to provide, to the first stream of data, the test data configured with the one or more configuration parameters. The set of instructions, when executed by one or more processors of the device, may cause the device to cause, based on providing the test data, the test to be performed based on one or more actions performed by the lambda function using the test data.

DETAILED DESCRIPTION

Figure 1A:
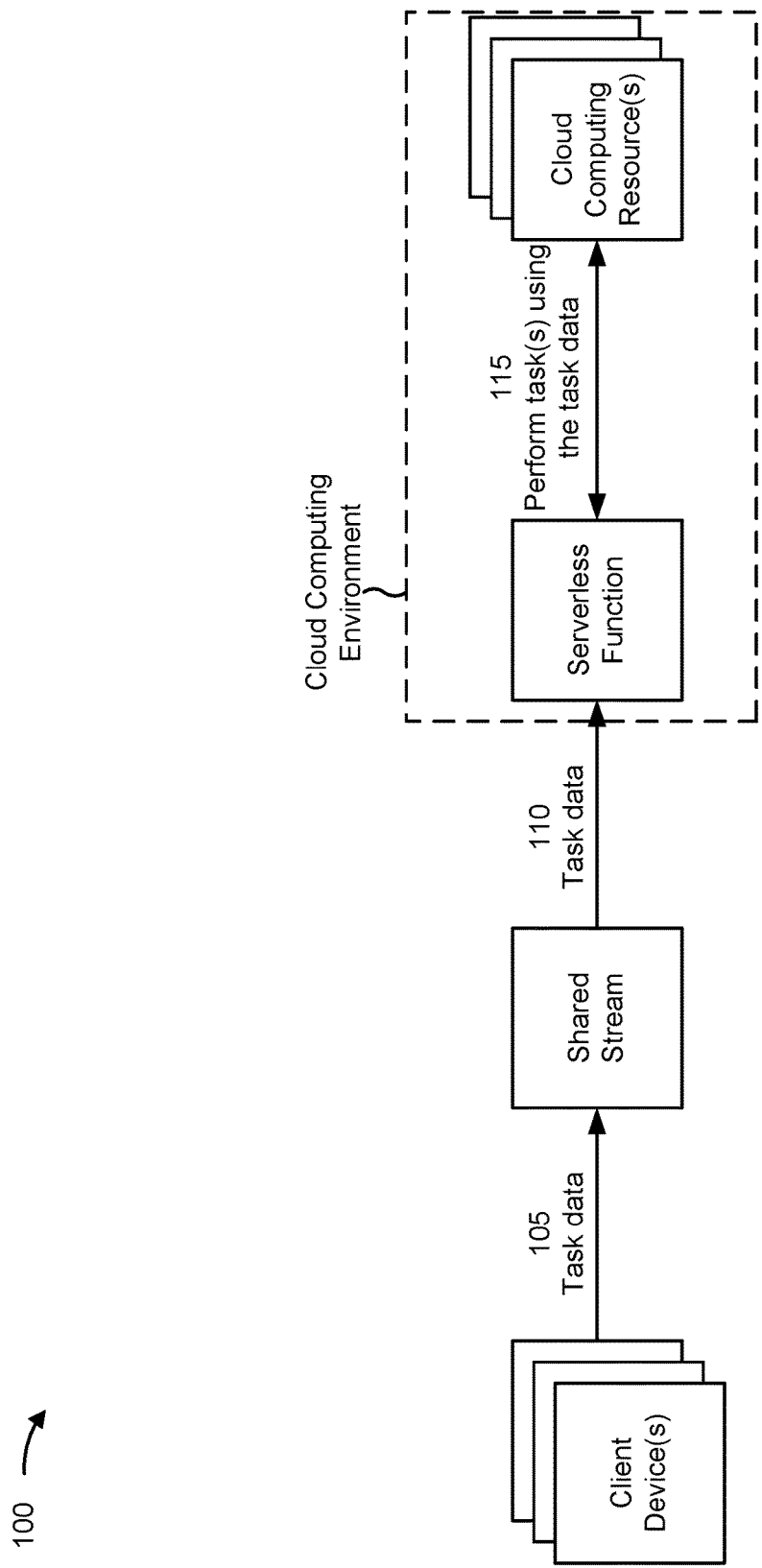
FIGS. 1A-1D are diagrams of an example associated with testing for tasks associated with, in accordance with some embodiments of the present disclosure.

The following detailed description of example implementations refers to the accompanying drawings. The same reference numbers in different drawings may identify the same or similar elements.

A cloud computing provider may provide a set of cloud computing services to an entity (e.g., a company, an organization, or an institution) via a cloud computing environment. The entity may have multiple accounts with the cloud computing provider, such that each of the multiple accounts may have access to different subsets of the set of cloud computing services. Further, the entity may be associated with a plurality of users (e.g., employees of the entity or other individuals associated with the entity) who may each have access to particular accounts of the multiple accounts. Accordingly, a large number of cloud computing resources may be deployed to various users of the entity.

Some tasks are particularly suitable for execution in a cloud computing environment. A "task" may refer to a computational process for a computer (e.g., execution of a model, sorting and classification of a data set, or migration of a database to another data structure, among other examples). A task may include multiple computational processes that are all logically grouped in a same job. For example, a user may write a configuration file (or another data structure including task instructions) that instructs a cloud environment to perform a job that includes a series of computational processes.

Tasks associated with large data sets are often more efficient to execute in virtual environments rather than on local machines. For example, tasks associated with large computational power are often more efficient to execute on distributed computing networks rather than on local machines. There are multiple providers of cloud computing resources. For example, Amazon® provides Elastic Compute Cloud (EC2®) and Elastic Kubernetes Service (EKS), among other examples. Similarly, Google® provides the Google Compute Engine (GCE) and the Google Cloud Dataproc. Microsoft® offers Azure® Virtual Machines and Azure Data Lake Analytics.

In some cases, tests may be performed for tasks and/or services associated with a cloud computing environment. For example, the tests may include functional tests and/or performance tests, among other examples. Functional tests may refer to testing the functionality of cloud-based applications and services to ensure they work as expected. This can include testing various features and functionality, such as user authentication, data storage, and/or data retrieval, among other examples. Performance tests may refer to testing the performance of cloud-based applications and services, such as their scalability, reliability, and responsiveness. This can include testing an application's ability to handle a large number of users or requests, as well as testing the application's ability to recover from failures or downtime. Both functional and performance tests are important in the context of cloud computing because they help ensure that cloud-based applications and services are able to meet the needs of users and are able to operate effectively in a distributed, highly scalable environment. Additionally, functional testing can help ensure that the application or service is secure and does not contain any vulnerabilities, while performance testing can help ensure that the application or service is able to handle the expected workloads and can scale as needed.

In some examples, a cloud computing environment may be associated with a "serverless" framework. A serverless framework may refer to a cloud architecture in which developers may build and run applications and services without the need for provisioning or managing servers. For example, a serverless framework may allow developers to take advantage of the scalability, reliability, and cost-effectiveness of cloud-based infrastructure without having to provision or manage the underlying infrastructure. When using a serverless framework, developers may write code that runs in response to specific events, such as incoming application programming interface (API) requests or changes in data storage. The cloud provider may be responsible for running and scaling the code, as well as providing the necessary resources and/or infrastructure, such as memory and computing power, among other examples. Because serverless frameworks may only charge for the specific resources and computing time used, a serverless framework can be a cost-effective solution for applications that have unpredictable workloads or experience sudden spikes in traffic. Additionally, serverless frameworks also provide built-in high availability and auto-scaling capabilities, so a task can automatically scale up or down based on the number of requests associated with the take, which can help ensure that the task is always available and responsive. One example of a serverless framework is the Amazon Web Services (AWS®) Lambda framework.

Testing tasks in a cloud serverless framework may present one or more challenges. For example, in some cases, a task in serverless framework may be associated with a stream of data. For example, a function (e.g., a lambda function) of the serverless framework may retrieve data from the stream and cause one or more operations to be performed using the data in the cloud computing environment. Typically, the stream of data may be shared or common among multiple applications, multiple services, and/or multiple teams of an entity, among other examples. For example, the stream of data may be associated with a distributed streaming platform that is associated with handling large amounts of data streams and making the data streams available for real-time processing by different applications and services. A test (e.g., a performance test and/or a functional test) of the function associated with the task may use the stream of data (e.g., the shared or common stream of data) to obtain test data and provide the test data to the function of the serverless framework in accordance with a testing framework. However, the test may consume processing resources, memory resources, and/or computing resources, among other examples, of a server device associated with the stream of data and/or with the distributed streaming platform.

As a result, applications, services, and/or teams that access and/or use the stream of data may experience slowdowns, interruptions, and/or loss of data, among other examples, because of the performance of the test using the shared stream of data. For example, testing may occur in parallel to integration and/or deployment of applications that utilize the stream of data (e.g., in accordance with a continuous integration, continuous testing, and continuous deployment (CI/CT/CD) model). As a result, testing that occurs in parallel to integration and/or deployment of applications utilizing the stream of data may result in poor performance for applications and/or services associated with the stream of data (e.g., applications and/or services that are deployed at the time of testing). However, the stream of data may be needed to perform the test to ensure that the test is being performed using data that is associated with a data type, an event type, and/or other configuration parameters that are associated with the task being tested. Otherwise (e.g., if the test is performed using data having incorrect or inaccurate configuration parameters), the results of the test may be inaccurate, thereby consuming processing resources, memory resources, and/or computing resources, among other examples, associated with performing the test that produces inaccurate testing results.

Some implementations described herein enable testing for tasks associated with a cloud computing serverless function. For example, the task may be associated with customer data that is obtained via a shared stream of data provided by a distributed streaming platform. In some implementations, a testing device may obtain and/or generate test data for the task. The testing device may configure the test data with one or more configuration parameters. In some implementations, the one or more configuration parameters may be based on a test type associated with the test, an event type associated with an event that is associated with the test, and/or a data type of data associated with the task, among other examples. For example, the one or more configuration parameters may configure the test data have properties of a data type and/or an event type of data being tested (e.g., to simulate data from the shared stream of data). Additionally, the one or more configuration parameters may configure test information, such as a configuration file of a test to be performed.

The testing device may provide the configured test data to a dedicated or private stream of data provided by the distributed streaming platform. For example, the testing device may provide the configured test data to a second stream provided by the distributed streaming platform that is different than a first stream of data from which the serverless function in the cloud computing platform is configured to obtain data associated with performing the task. Providing the test data to the dedicated or private stream of data may cause the serverless function to retrieve the test data from the dedicated or private stream of data and to perform one or more operations (e.g., in the cloud computing environment) using the test data. The test may be performed (e.g., by the serverless function, the testing device, or another component of the cloud computing environment) based on the one or more operations and based on the configuration parameters of the test data. The testing device may obtain test results based on the performance of the test that is performed using the test data.

As a result, by providing the test data to a dedicated stream of data, integration and/or deployment of tasks, operations, and/or services that use the stream of data (e.g., the shared stream of data) are not negatively impacted by the performance of the test. For example, continuous integration, continuous testing, and continuous deployment of tasks, operations, and/or services that use the stream of data may be achieved, thereby enabling efficient and cost-effective building, testing, and deployment of cloud-based applications and services. Additionally, by configuring the test data to simulate customer data associated with a stream of data that is used by the serverless function to perform the task, the testing device may improve an accuracy of test results (e.g., as compared to using test data that is not configured for a specific data type and/or event type to be tested). This conserves processing resources, memory resources, and/or computing resources, among other examples, that would have otherwise been used for performing a test that produces inaccurate testing results.

FIGS. 1A-1D are diagrams of an example 100 associated with testing for tasks associated with. As shown in FIGS. 1A-1D, example 100 includes one or more client devices, a cloud computing environment, a serverless function, one or more cloud computing resources, and a testing device. These devices are described in more detail in connection with FIGS. 2 and 3.

As shown in FIG. 1A, a task may be performed via a serverless function in the cloud computing environment. A serverless function may be code that runs in the cloud computing environment and is executed in response to a specific trigger or event. A serverless function may be referred to interchangeably herein as a lambda function and/or an anonymous function. The serverless function may be stateless, meaning that the serverless function does not retain any data or state between invocations. This allows the serverless function to scale horizontally and be triggered multiple times concurrently without interference.

Additionally, the serverless function may be managed by a cloud provider associated with the cloud computing environment. Therefore, developers (e.g., associated with developing the task or service) may not need to provision or maintain servers or infrastructure associated with performing the task or service. Instead, the developers can simply upload code and configure the triggers and events that will invoke the serverless function and the cloud provider may handle provisioning resources and infrastructure associated with executing the code via the serverless function. Serverless functions may be cost effective because the developers may only be charged (e.g., for use by the cloud provider) for the duration of the function execution and will not incur any charges when serverless functions are not running. This makes serverless functions well-suited for applications that require frequent, short-duration executions, such as image or video processing, data stream processing, and/or real-time data analysis, among other examples.

For example, as shown by reference number 105, the one or more client devices may provide, and a shared stream may obtain, task data. The task data may be any data that is used to perform a task in the cloud computing environment. For example, the task data may include customer data (e.g., generated via customer interactions and/or customer analytics), consumer data, financial data (e.g., data associated with financial transactions), and/or another type of data. The shared stream may be a stream of data provided by and/or managed by a distributed streaming platform. For example, the distributed streaming platform may be associated with a publish-subscribe messaging system that allows for the handling of large amounts of data streams in real-time. The publish-subscribe messaging system may include producers (e.g., the one or more client devices) that write data to a stream and consumers (e.g., the serverless function) that read the data from the stream.

A stream of data (e.g., the shared stream) provided and/or managed by the distributed streaming platform may also be referred to as a topic. Topics may be a stream of records (messages) and/or data that are organized into partitions. Each partition may be a sequence of ordered, immutable records that are written to and read from sequentially. This allows for parallel processing of the data in a topic by different consumers, while maintaining the order of the records within each partition. The distributed streaming platform may enable high-throughput, low-latency data streams. Further, the distributed streaming platform can handle hundreds of thousands of messages per second. The messages may be stored in a distributed manner across a cluster of servers, which allows for horizontal scalability and fault tolerance. In other words, the distributed streaming platform may enable real-time data pipelines and streaming applications to be used in connection with the cloud computing environment. One example of a distributed streaming platform is Apache Kafka® (e.g., if the distributed streaming platform is Apache Kafka, then the stream of data may be referred to as a Kafka topic).

The shared stream (e.g., a shared topic) may be shared among multiple client devices, multiple tasks, multiple services, and/or multiple applications, among other examples. For example, the shared stream may be used to obtain data for processing associated with multiple tasks, multiple services, and/or multiple serverless functions, among other examples. In other words, the shared stream of data may provide data that is used for multiple purposes across multiple teams, applications, and/or services.

As shown by reference number 110, the shared stream may provide, and/or the serverless function may obtain, task data. For example, the serverless function may be configured to obtain and/or retrieve data from the shared stream for the purpose of performing a task in the cloud computing environment (e.g., the task may be performable via data from the shared stream). In some implementations, the serverless function may be configured to periodically obtain data from the shared stream. Additionally, or alternatively, the serverless function may be configured to obtain data from the shared stream based on detecting another trigger event, such as a command received from a client device, an amount of data included in the shared stream, and/or an arrival of data in the shared stream, among other examples.

As shown by reference number 115, the serverless function may cause one or more tasks to be performed using the task data. For example, the serverless function may cause the one or more cloud computing resources to perform a task using the task data. The one or more cloud computing resources may include processing resources, memory resources, a container, and/or a virtual machine, among other examples.

Figure 1B:
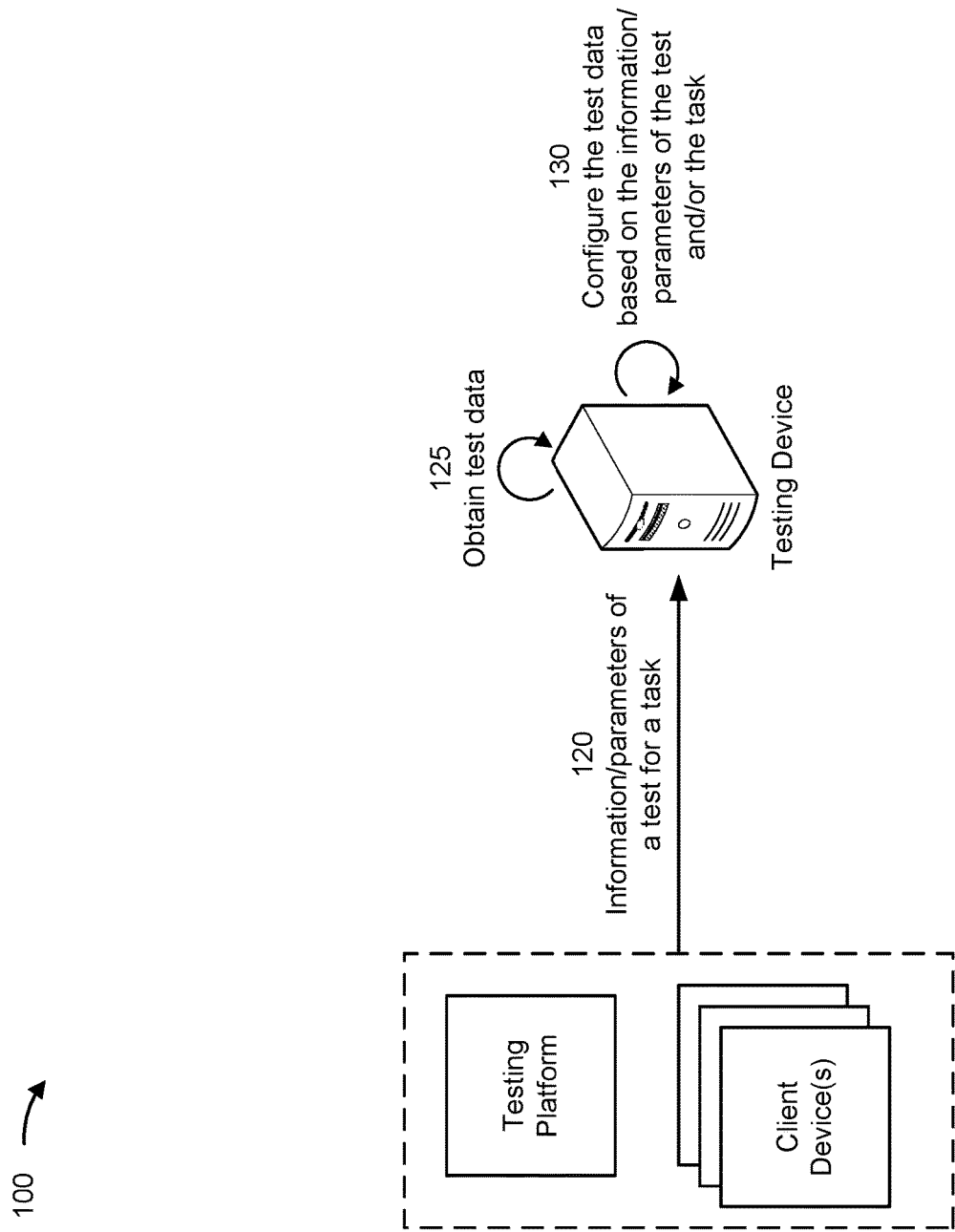

As shown in FIG. 1B, the testing device may generate and/or configure test data for testing a task associated with the serverless function. For example, as shown by reference number 120, the testing device may obtain information and/or parameters of a test for a task. For example, the testing device may obtain the information and/or parameters from a local device (e.g., one or more client devices). The one or more client devices may be the same devices as depicted in FIG. 1A or may be different devices. For example, a client device may provide, and the testing device may obtain, the information and/or parameters of the test for the task. Additionally, or alternatively, the testing device may obtain the information and/or parameters from a testing platform. The testing platform may refer to the infrastructure and tools that are used to test and validate the functionality and performance of cloud-based tasks (e.g., applications and/or services). For example, a testing platform may include hardware, software, and/or network configurations that are used to simulate different environments and test scenarios for the cloud computing environment and/or for the serverless function. For example, the testing platform may be associated with testing and validating the functionality, performance, and scalability of cloud-based tasks, and can help to ensure that the tasks meet the requirements and are free of defects.

For example, the information and/or parameters of the test for the task may include a configuration file associated with the testing platform. The configuration file may indicate a type of test to be performed, information to enable the serverless function to create virtual machines and/or containers that can be used to simulate different environments and test scenarios, and/or a configuration of tools to allow for the automated execution of tests, such as functional tests and/or performance tests, and the collection of test results, among other examples. In some implementations, the configuration file may point to resources and/or infrastructure to be used by the serverless function to perform the test. Additionally, or alternatively, the configuration file may configure one or more tools (e.g., virtualization software tools, test automation tools, test data management tools, load testing tools, monitoring and logging tools, and/or test management tools) to be used to perform the test.

In some implementations, the test may be associated with an event. For example, the test may be associated with testing a performance and/or functionality of a task when the event occurs. For example, if the task is associated with transaction data, then the event may be a failed authorization and/or a decline associated with a transaction. As another example, the event may be associated with a failure of a non-cloud-based service or application. As another example, the event may be associated with a certain result of an application or service. In other words, the event can be any event that may occur and/or may be indicated by task data associated with the task.

In some implementations, the test may be associated with a data type. For example, the task data may be associated with one or more data types. As an example, if the task is associated with transaction data, then the data types may include card-present transaction data, card-not-present transaction data, and/or virtual card number transaction data, among other examples. As another example, the data types may include data associated with different types of users (e.g., individual user data or enterprise user data), different types of applications, different types of services, and/or different physical locations, among other examples. For example, the test may be associated with a functionality or a performance of the serverless function associated with performing the task for a given event and/or a given data type.

As shown by reference number 125, the testing device may obtain test data. In some implementations, the testing device may obtain the test data from memory and/or a database. For example, the testing device may store test data to be retrieved when generating test data for a given test. In some implementations, the test data may be historical task data. In other implementations, the test data may be randomly generated data. For example, the testing device may generate the test data based on an event that is associated with the test and/or a data type of data associated with the task, among other examples. In some implementations, the testing device may obtain the test data from the shared stream of data.

As shown by reference number 130, the testing device may configure the test data based on information and/or parameters of the test and/or the task. For example, the testing device may configure the test data with one or more configuration parameters. The one or more configuration parameters may be based on a test type associated with the test, an event type associated with an event that is associated with the test, a data type of data associated with the task, a configuration file associated with the test, a testing platform associated with the test, and/or information associated with the test, among other examples.

For example, the one or more configuration parameters may include schema associated with the test data. In some implementations, the schema may include one or more rules indicating how the test data is to be entered, stored, and/or retrieved by the serverless function. The schema associated with the test data may include a structure of the test data. For example, the schema may define the organization, relationships, and/or types of data associated with the test data. In some implementations, the schema may define tables, fields, relationships between tables, data types, primary keys, foreign keys, and/or a document-based data structure (e.g., a structure of individual documents and collections), among other examples. In other words, the one or more configuration parameters may include schema to configure the test data to simulate a data type and/or an event type that is associated with the task and/or the test.

In some implementations, the one or more configuration parameters may include a configuration file associated with the test. For example, the configuration file may indicate what test is to be performed and/or how the test is to be performed. In some implementations, the testing device may obtain, from the testing platform associated with the test, information associated with the test. The information associated with the test may include the configuration file, an event file, and/or a properties file, among other examples. The one or more configuration parameters may include, or may be based on, the information associated with the test. In some implementations, the configuration file may be a configuration file of the test to be performed and/or of the testing platform. For example, the test may be associated with simulating a large number of concurrent users accessing an application associated with the cloud computing environment, and measuring the response times, resource utilization, and/or overall performance of the system under test. The configuration file may indicate settings and/or parameters for performing the test, such as a number of threads (e.g., virtual or simulated users), a ramp-up time, a test duration, a test plan, and/or a target system or application to be tested, among other examples.

The event file may refer to a log or record of events that occur within the cloud computing environment. The event file may be associated with tracking the progress of the test and/or recording test results. During a test, various events may occur, such as the start and end of the test, the execution of test cases, and/or the results of those test cases, among other examples. The event file may provide a record of these events, which can be used to diagnose issues, improve test processes, and/or analyze the performance of the system, among other examples. The one or more configuration parameters may configure the event file for the test. The properties file may refer to a configuration file that contains settings or properties that are used by a test or application. The properties file may define test parameters, configurations, and other relevant information that are needed to run a test. For example, the properties file may include key-value pairs that represent the various settings and configurations to be associated with the test. The properties may include information, such as the location of the test data, a number of test iterations to be performed, and/or any parameters required to connect to cloud-based resources to perform the test, among other examples.

The testing device may compile the test data based on the one or more configuration parameters. For example, the testing device may generate a payload that includes the test data and the one or more configuration parameters. This may enable the testing device to simulate task data associated with a particular event and/or data type and to associate the simulated task data with a particular test. This improves the accuracy of the test because the test data is configured based on the event type associated with the event that is associated with the test and/or the data type of data associated with the task, among other examples, to accurately simulate real-world test data. As described elsewhere herein, this enables the serverless function and/or the task to be tested in real-time (e.g., during deployment) without using the shared stream, thereby minimizing interruptions and/or degraded performance of the shared stream.

Figure 1C:
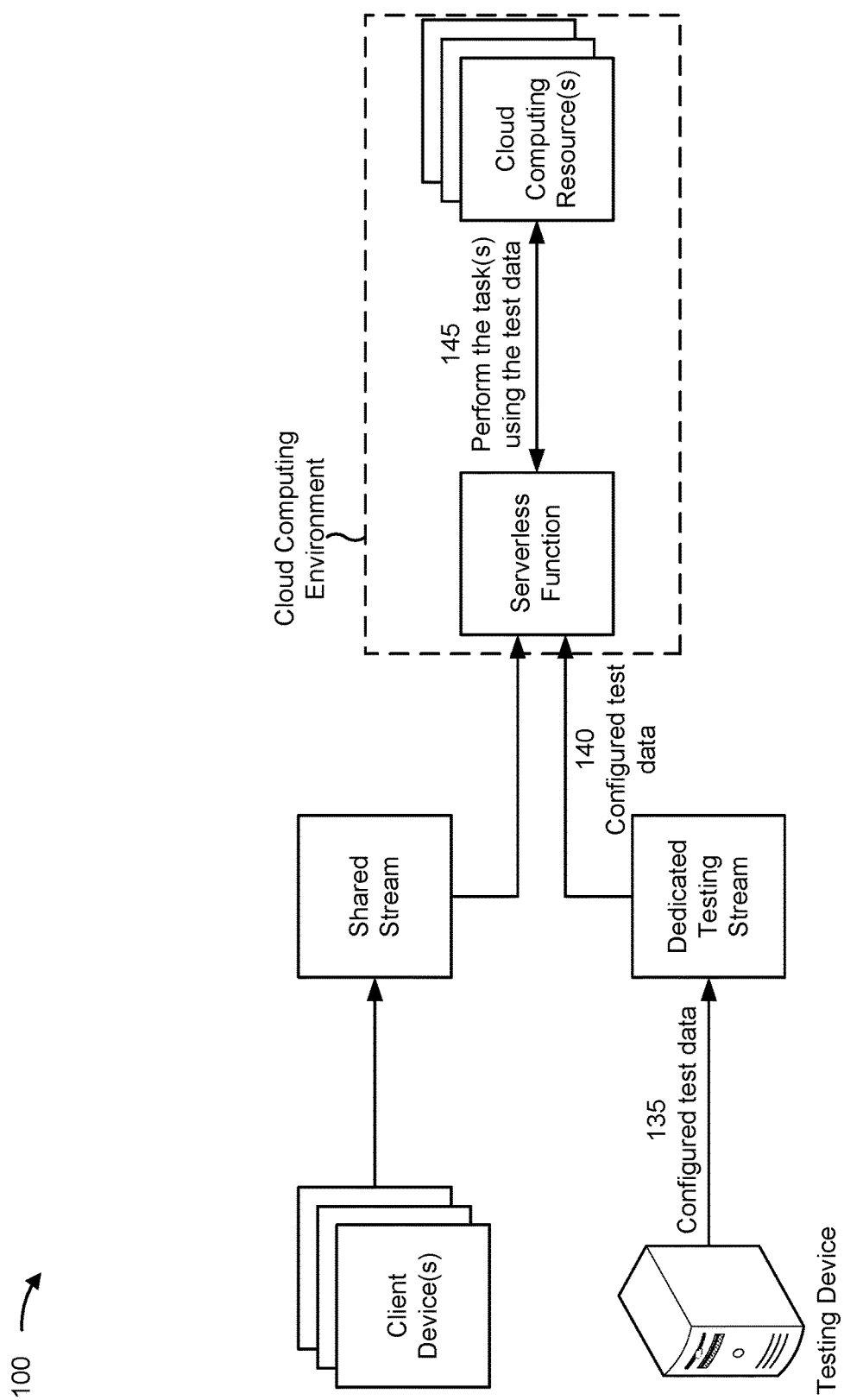

As shown in FIG. 1C, and by reference number 135, the testing device may provide, to a dedicated testing stream, configured test data. For example, the testing device may provide the test data (e.g., configured in accordance with the one or more configuration parameters) to the dedicated testing stream. In other words, the testing device may provide the generated payload that includes the test data and the one or more configuration parameters to the dedicated testing stream.

The dedicated testing stream may be a stream of data associated with (e.g., provided by and/or managed by) the distributed streaming platform. For example, the dedicated testing stream may be a first stream of data associated with the distributed streaming platform and the shared stream may be a second stream of data associated with the distributed streaming platform. In other words, the shared stream and the dedicated testing stream may be separate streams (e.g., separate topics or separate feeds) associated with (e.g., provided by and/or managed by) the distributed streaming platform. The dedicated testing stream may be a stream of data that is dedicated to providing test data to the serverless function for testing a given task. For example, the dedicated testing stream may be a private topic (e.g., a private Kafka topic) associated with the distributed streaming platform. As shown in FIG. 1C, the serverless function may be configured to obtain data from both the dedicated testing stream (e.g., a first stream of data) and the shared stream (e.g., a second stream of data).

For example, as shown by reference number 140, the serverless function may obtain, from the dedicated testing stream, the configured test data. For example, the serverless function may be configured to retrieve data from the dedicated testing stream. For example, the serverless function may be configured as a consumer associated with the dedicated testing stream. In other words, the serverless function may be configured with a subscription to the dedicated testing stream (e.g., the serverless function may be a subscriber to the dedicated testing stream) and may obtain messages (e.g., the configured test data) as the messages are produced by producers (e.g., the testing device) associated with the dedicated testing stream. For example, the serverless function may be configured with a trigger event to cause the serverless function to retrieve test data from the dedicated testing stream after test data is provided to the dedicated testing stream. In other words, the testing device providing the configured test data to the dedicated testing stream may cause (e.g., may trigger) the serverless function to retrieve the configured test data from the dedicated testing stream.

As shown by reference number 145, the serverless function may perform one or more tasks (e.g., via one or more cloud computing resources) using the test data. For example, the one or more tasks may be indicated by the one or more configuration parameters associated with the test data. For example, the serverless function may use one or more containers and/or virtual machines associated with the cloud computing environment to perform the one or more tasks in accordance with the one or more configuration parameters.

Figure 1D:
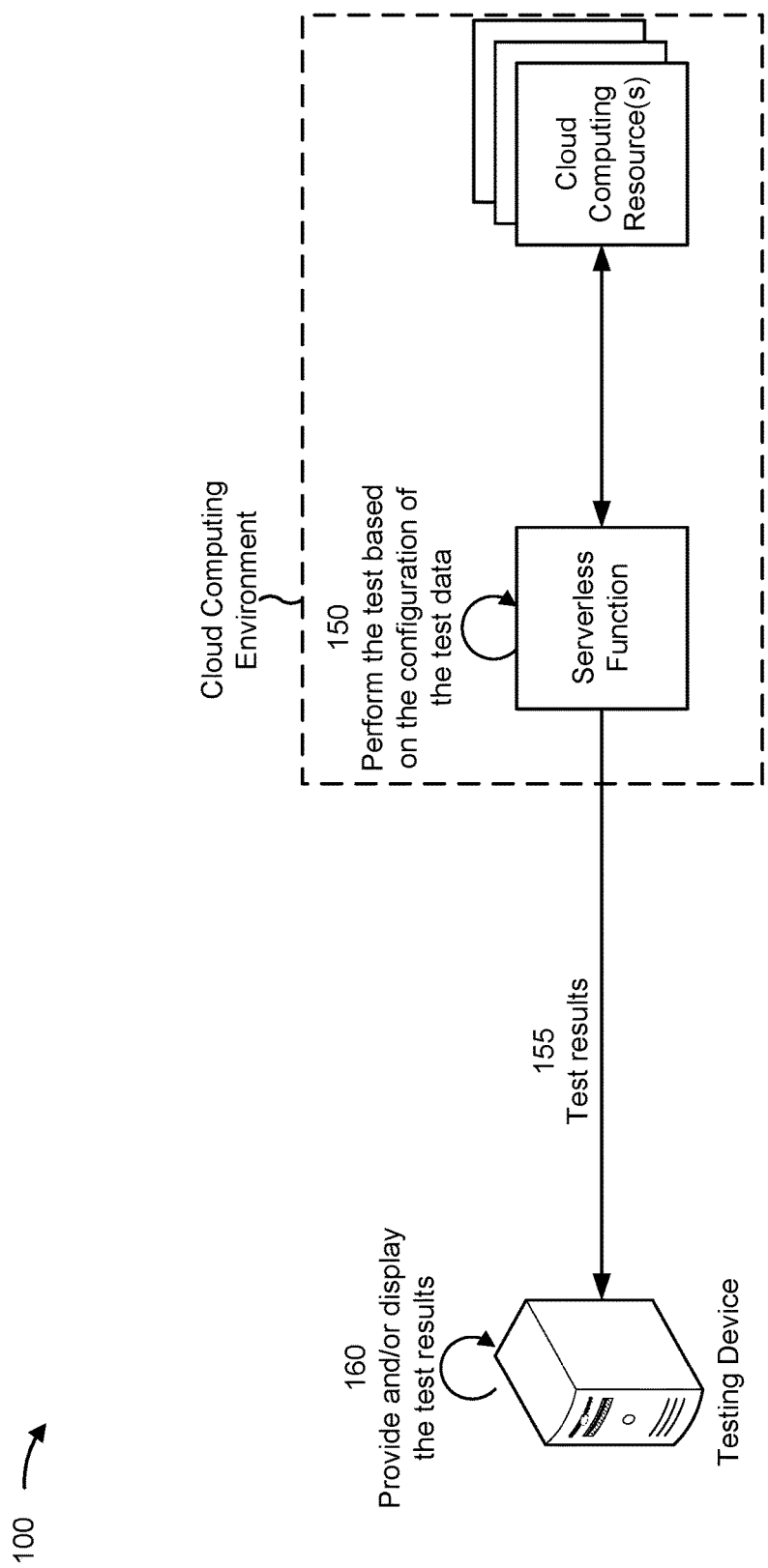

As shown in FIG. 1D, and by reference number 150, the serverless function may perform the test based on the configuration of the test data. For example, the serverless function may perform the test in accordance with the one or more configuration parameters of the test data. In some implementations, another device (e.g., in the cloud computing environment or outside of the cloud computing environment) may perform the test (e.g., instead of the serverless function), such as the testing device or a server device associated with the testing platform.

In some implementations, performing the test may include load testing, stress testing, scalability testing, security testing, compatibility testing (e.g., testing a compatibility of the one or more tasks with different operating systems, browsers, and/or devices), recovery testing, performance testing, and/or functional testing, among other examples. For example, the test may be associated with testing a performance and/or a functionality of the one or more tasks performed using the test data (e.g., the one or more tasks performed as described in connection with reference number 145). For example, the test may determine whether the one or more tasks were performed successfully, an amount of time associated with performing the one or more tasks, a latency or delay associated with performing the one or more tasks, and/or a responsiveness associated with performing the one or more tasks, among other examples. For example, the test may be a functional test and/or a performance test. In some implementations, the test may be a JMeter™ (e.g., Apache JMeter) test. For example, the test may be associated with analyzing and/or measuring the performance and/or functionality of a task (e.g., a web-based task) that is performed in the cloud computing environment.

In some implementations, the serverless function may generate and/or obtain test results associated with the test.

For example, the test results may include information associated with the performance, reliability, security, and/or functionality, among other examples, of the one or more tasks. For example, the test results may indicate whether the one or more tasks associated with the test were performed successfully. In some implementations, the test results may indicate a response time (e.g., an amount of time associated with initiating the one or more tasks), and/or a duration associated with performing the one or more tasks.

As shown by reference number 155, the testing device may obtain the test results. In some implementations, the testing device may obtain the test results from the serverless function. In other examples, the testing device may obtain the test results from another device, such as a server device associated with the testing platform. In some implementations, as shown by reference number 160, the testing device may provide and/or display the test results. For example, the testing device may provide, to another device (e.g., a client device), an indication of the test results. For example, the testing device may cause the test results to be presented for display via the other device. In other examples, the serverless function and/or the server device associated with the testing platform may provide the test results directly to the other device (e.g., the client device).

As a result, by providing the test data to a dedicated stream of data, integration and/or deployment of tasks, operations, and/or services that use the stream of data (e.g., the shared stream of data) are not negatively impacted by the performance of the test. For example, continuous integration, continuous testing, and continuous deployment of tasks, operations, and/or services that use the stream of data may be achieved, thereby enabling efficient and cost-effective building, testing, and deployment of cloud-based applications and services. Additionally, by configuring the test data to simulate customer data associated with a stream of data that is used by the serverless function to perform the task, the testing device may improve an accuracy of test results (e.g., as compared to using test data that is not configured for a specific data type and/or event type to be tested). This conserves processing resources, memory resources, and/or computing resources, among other examples, that would have otherwise been used for performing a test that produces inaccurate testing results.

As indicated above, FIGS. 1A-1D are provided as an example. Other examples may differ from what is described with regard to FIGS. 1A-1D.

Figure 2:
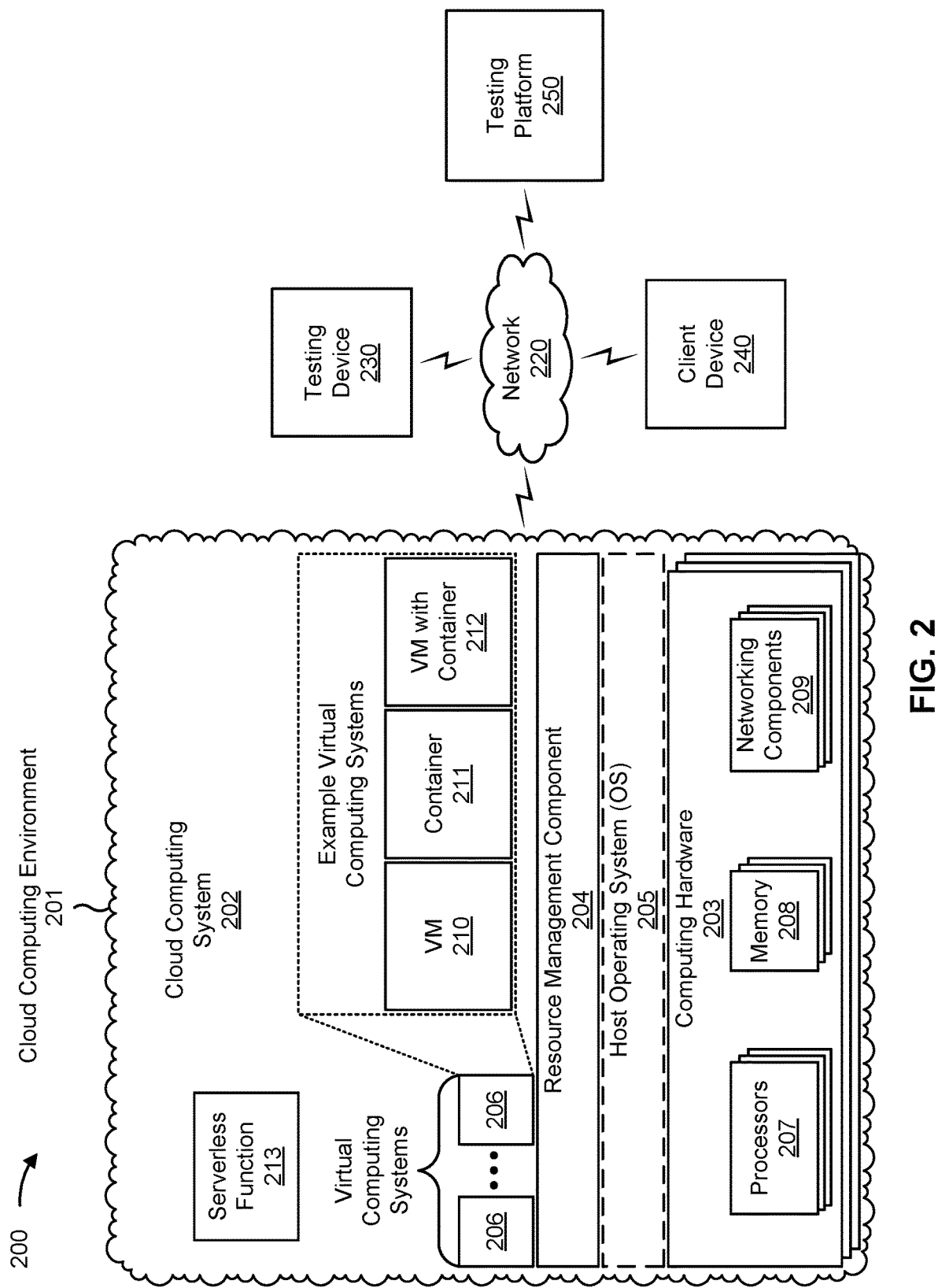
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a cloud computing environment 201, which may include one or more elements of and/or may execute within a cloud computing system 202. The cloud computing system 202 may include one or more elements 203-213, as described in more detail below. As further shown in FIG. 2, environment 200 may include a network 220, a testing device 230, a client device 240, and/or a testing platform 250. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A container 211 may include an environment associated with executing an application in the cloud computing system 202. For example, a container 211 may include application code, runtime, system tools, libraries, and/or settings, among other examples, associated with executing an application. In some implementations, each container 211 may be associated with a dedicated file system, network interfaces, and/or process namespace, among other examples. Containers 211 and virtual machines 210 may provide isolation and abstraction for applications. In some implementations, a container 211 may be referred to as a Docker container, such as when a container 211 utilizes Docker as a containerization platform. A virtual machine 210 may be associated with a full copy of a host operating system (e.g., the host operating system 205) to enable the virtual machine 210 to operate. A container 211 may share a host operating system kernel with the cloud computing system 202 and may only include the software libraries and dependencies needed to run an application (e.g., enabling the container 211 to be smaller in size than a virtual machine 210 and to stop and/or start operations faster than a virtual machine 210).

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

The cloud computing system 202 may include a serverless function 213. The serverless function 213 may be referred to as an anonymous function and/or a lambda function, among other examples. The serverless function 213 may include code that executes in the cloud computing environment 201 and that is executed in response to a specific trigger or event. The serverless function 213 may enable a provider associated with the cloud computing environment 201 to provision infrastructure and/or resources (e.g., computing hardware 203, one or more virtual computing systems 206, one or more processors 207, one or more memories 208, one or more networking components 209, one or more virtual machines 210, one or more containers 211, and/or one or more hybrid environments 212) in response to tasks and/or requests to be performed in the cloud computing environment 201. For example, the serverless function 213 may enable the provider to abstract away the underlying infrastructure and to handle the management, maintenance and/or scaling of resources for executing user-defined functions associated with the serverless function 213.

Although the cloud computing environment 201 may include one or more elements 203-213 of the cloud computing system 202, may execute within the cloud computing system 202, and/or may be hosted within the cloud computing system 202, in some implementations, the cloud computing environment 201 may not be cloud-based (e.g., may be implemented outside of a cloud computing system) or may be partially cloud-based. For example, the cloud computing environment 201 may include one or more devices that are not part of the cloud computing system 202, such as device 300 of FIG. 3, which may include a stand-alone server or another type of computing device. The cloud computing environment 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The testing device 230 may include one or more devices capable of receiving, generating, storing, processing, providing, and/or routing information associated with testing for tasks associated with a cloud computing serverless function (e.g., the serverless function 213), as described elsewhere herein. The testing device 230 may include a communication device and/or a computing device. For example, the testing device 230 may include a server, such as an application server, a client server, a web server, a database server, a host server, a proxy server, a virtual server (e.g., executing on computing hardware), or a server in a cloud computing system. In some implementations, the testing device 230 may include computing hardware used in a cloud computing environment, such as the cloud computing environment 201.

The client device 240 may include one or more devices capable of receiving, generating, storing, processing, and/or providing information associated with testing for tasks associated with a cloud computing serverless function (e.g., the serverless function 213), as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The testing platform 250 may include one or more devices capable of receiving, generating, storing, processing, providing, and/or routing information associated with testing for tasks associated with a cloud computing serverless function (e.g., the serverless function 213), as described elsewhere herein. The testing platform 250 may include a communication device and/or a computing device. For example, the testing platform 250 may include a server, such as an application server, a client server, a web server, a database server, a host server, a proxy server, a virtual server (e.g., executing on computing hardware), or a server in a cloud computing system. In some implementations, the testing platform 250 may include computing hardware used in a cloud computing environment, such as the cloud computing environment 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
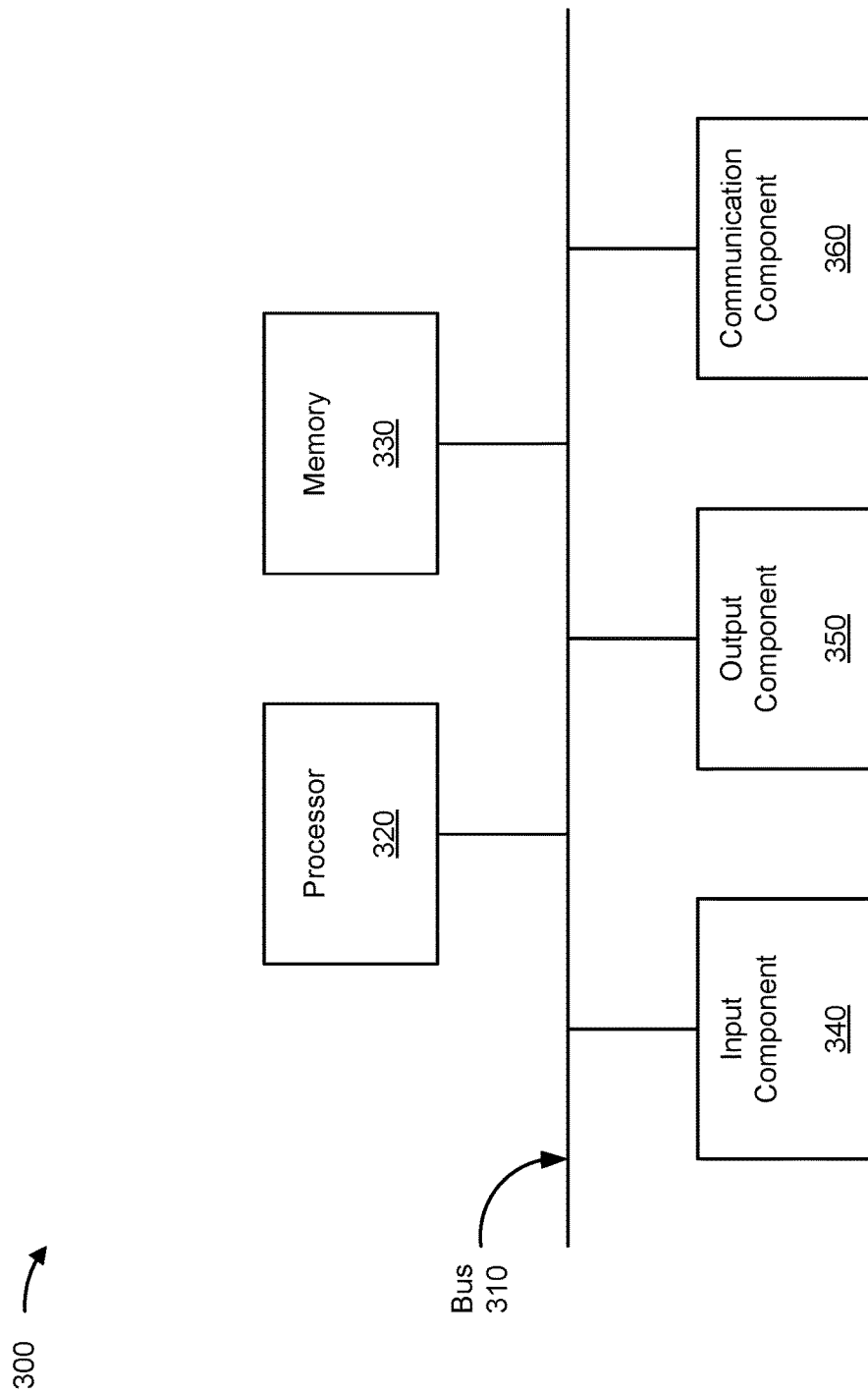
FIG. 3 is a diagram of example components of a device associated with dynamic and secure permission role generation for cloud computing environments, in accordance with some embodiments of the present disclosure.

FIG. 3 is a diagram of example components of a device 300 associated with dynamic and secure permission role generation for cloud computing environments. The device 300 may correspond to the cloud computing system 202 (and/or one or more devices or components of the cloud computing system 202), the testing device 230, the client device 240, and/or the testing platform 250. In some implementations, the cloud computing system 202 (and/or one or more devices or components of the cloud computing system 202), the testing device 230, the client device 240, and/or the testing platform 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
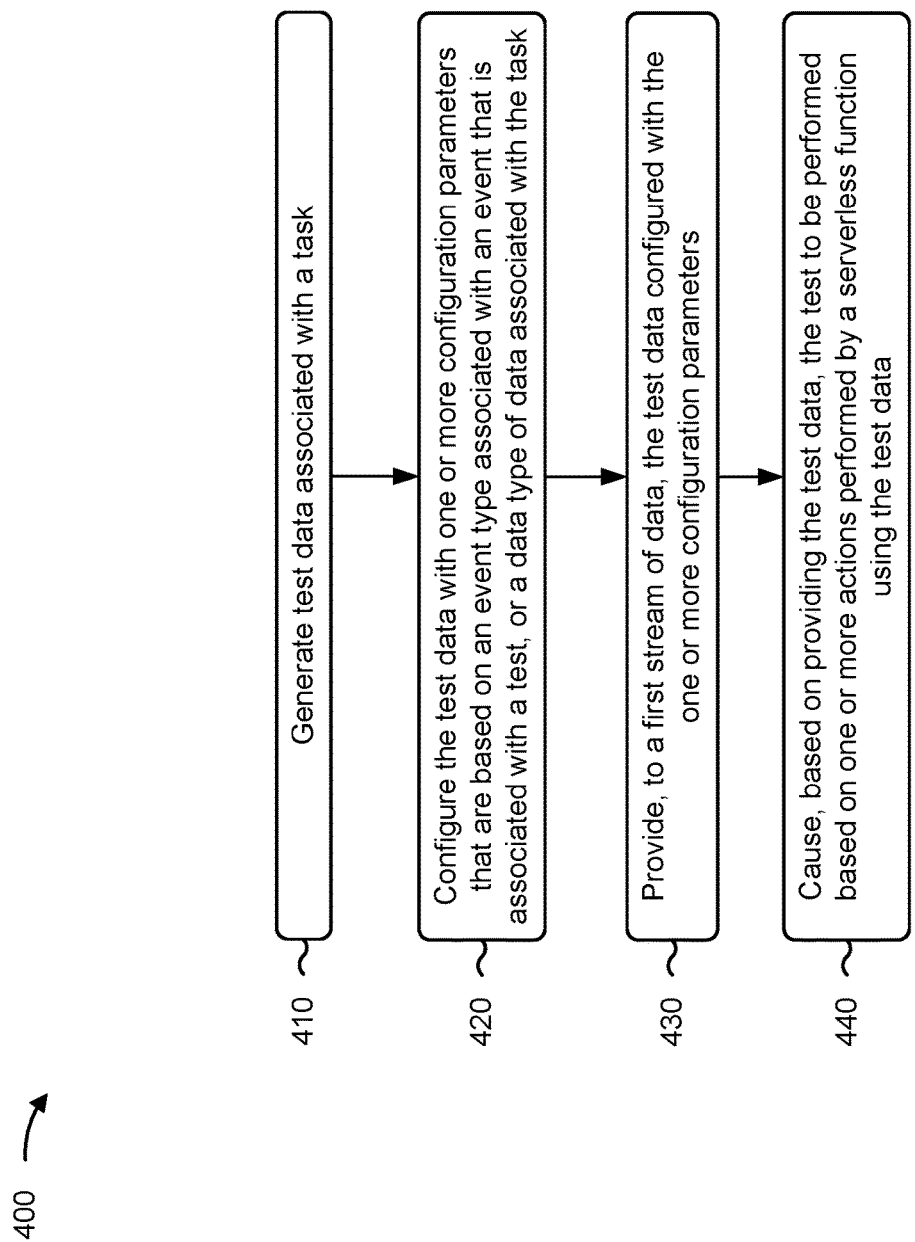
FIG. 4 is a flowchart of an example process associated with testing for tasks associated with a cloud computing serverless function, in accordance with some embodiments of the present disclosure.

FIG. 4 is a flowchart of an example process 400 associated with testing for tasks associated with a cloud computing serverless function. In some implementations, one or more process blocks of FIG. 4 may be performed by the testing device 230. In some implementations, one or more process blocks of FIG. 4 may be performed by another device or a group of devices separate from or including the testing device 230, such as the cloud computing system 202, the client device 240, and/or the testing platform 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include generating test data associated with the task (block 410). For example, the testing device 230 (e.g., using processor 320 and/or memory 330) may generate test data associated with the task, as described above in connection with reference number 125 of FIG. 1B. In some implementations, the task is configured to be performed by a serverless function in a cloud computing environment. In some implementations, the test data is associated with a first stream of data (e.g., a dedicated stream of data associated with a distributed streaming platform) associated with testing the task. In some implementations, the test data simulates task data associated with a second stream of data (e.g., a shared stream of data associated with the distributed streaming platform) that is used by the serverless function to perform the task.

As further shown in FIG. 4, process 400 may include configuring the test data with one or more configuration parameters that are based on an event type associated with an event that is associated with the test, or a data type of data associated with the task (block 420). For example, the testing device 230 (e.g., using processor 320 and/or memory 330) may configure the test data with one or more configuration parameters that are based on an event type associated with an event that is associated with the test, or a data type of data associated with the task, as described above in connection with reference number 130 of FIG. 1B. As an example, the testing device 230 may configure the test data with a schema, information associated with the test (e.g., a configuration file, an event file, and/or a properties file), and/or other configurations that are based on the event type and/or the data type. For example, the testing device 230 may cause the test data to have a structure and/or format that corresponds to task data (e.g., that is associated with the event type and/or the data type), as described in more detail elsewhere herein.

As further shown in FIG. 4, process 400 may include providing, to the first stream of data, the test data configured with the one or more configuration parameters (block 430). For example, the testing device 230 (e.g., using processor 320 and/or memory 330) may provide, to the first stream of data, the test data configured with the one or more configuration parameters, as described above in connection with reference number 135 of FIG. 1C. As an example, the testing device 230 may provide configured test data to the first stream of data (e.g., a dedicated stream) as a producer to cause one or more consumers (e.g., the serverless function) associated with the first stream of data to retrieve the configured test data from the first stream of data.

As further shown in FIG. 4, process 400 may include causing, based on providing the test data, the test to be performed based on one or more actions performed by the anonymous function using the test data (block 440). For example, the testing device 230 (e.g., using processor 320 and/or memory 330) may cause, based on providing the test data, the test to be performed based on one or more actions performed by the anonymous function using the test data, as described above in connection with reference number 150 of FIG. 1D. As an example, the testing device 230 may cause the test to be performed based on the serverless function being configured to retrieve the configured test data from the first stream of data. For example, the one or more configuration parameters of the test data may cause (e.g., may instruct) the serverless function and/or another device to perform the test, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for a generation and performance of a test for a task associated with a serverless function included in a cloud computing environment, the system comprising:
   one or more memories; and
   one or more processors, coupled to the one or more memories, configured to:
      configure test data to simulate data from a shared stream of data provided by a distributed streaming platform,
      wherein the shared stream of data is used by the serverless function to perform the task,
      wherein the test data is used by the serverless function to test the task, and
      wherein one or more configuration parameters of the test data are based on at least one of a test type associated with the test, an event type associated with an event that is associated with the test, or a data type of data associated with the task; and
      provide, to a dedicated stream of data provided by the distributed streaming platform, the test data to cause the test to be performed, by the serverless function, using the test data,
      wherein the dedicated stream of data is a separate stream from the shared stream of data.

2. The system of claim 1, wherein the one or more configuration parameters include schema associated with the test data.

3. The system of claim 1, wherein the one or more configuration parameters include a configuration file associated with the test.

4. The system of claim 1, wherein the one or more processors are further configured to:
   obtain, from the serverless function and based on providing the test data to the dedicated stream of data, test results associated with the test; and
   provide, to a device, an indication of the test results.

5. The system of claim 1, wherein the test is at least one of a functional test of the task or a performance test of the task.

6. The system of claim 1, wherein the serverless function is at least one of an anonymous function or a lambda function.

7. The system of claim 1, wherein the one or more processors are further configured to:
obtain, from a testing platform, information associated with the test,
wherein the one or more configuration parameters are based on the information associated with the test, and
wherein the information associated with the test includes at least one of:
a configuration file,
an event file, or
a properties file.

8. A method for a generation and performance of a test for a task associated with an anonymous function, included in a cloud computing environment, comprising:
generating, by a device, test data;
configuring, by the device, the test data to simulate data from a shared stream of data provided by a distributed streaming platform,
wherein the shared stream of data is used by the anonymous function to perform the task,
wherein the test data is used by the anonymous function for testing the task, and
wherein the test data is configured with one or more configuration parameters that are based on an event type associated with an event that is associated with the test, or a data type of data associated with the task;
providing, by the device and to a dedicated stream of data provided by the distributed streaming platform, the test data,
wherein the dedicated stream of data is a private stream and is separate from the shared stream of data; and
causing, by the device and based on providing the test data, the test to be performed based on one or more actions performed by the anonymous function using the test data.

9. The method of claim 8, wherein the one or more configuration parameters are based on at least one of:
a test type associated with the test,
a configuration file associated with the test, or
a testing platform associated with the test.

10. The method of claim 8, wherein the configuration parameters include one or more rules indicating how the test data is to be entered, stored, or retrieved by the anonymous function.

11. The method of claim 8,
wherein the anonymous function is configured to obtain data from the dedicated stream of data and the shared stream of data.

12. The method of claim 8, further comprising:
obtaining, from the anonymous function and based on providing the test data to the dedicated stream of data, test results associated with the test; and
providing, to another device, an indication of the test results.

13. The method of claim 8, wherein the anonymous function is a lambda function.

14. The method of claim 8, further comprising:
obtaining, from a testing platform, information associated with the test,
wherein the one or more configuration parameters are based on the information associated with the test.

15. A non-transitory computer-readable medium storing a set of instructions, the set of instructions comprising:
one or more instructions that, when executed by one or more processors of a device, cause the device to:
generate test data;
configure the test data to simulate data from a shared stream of data provided by a distributed streaming platform,
wherein the shared stream of data is used by a lambda function, included in a cloud computing environment, to perform a task,
wherein the test data is used by the lambda function for testing the task, and
wherein the test data is configured with one or more configuration parameters that are based on an event type associated with an event that is associated with a test or a data type of data associated with the task;
provide, to a dedicated stream of data provided by the distributed streaming platform, the test data,
wherein the dedicated stream of data is a separate feed from the shared stream of data; and
cause, based on providing the test data, the test to be performed based on one or more actions performed by the lambda function using the test data.

16. The non-transitory computer-readable medium of claim 15, wherein the shared stream of data is associated with a plurality of tasks, including the task, in the cloud computing environment.

17. The non-transitory computer-readable medium of claim 15, wherein the one or more configuration parameters are based on at least one of:
a test type associated with the test,
a configuration file associated with the test, or
a testing platform associated with the test.

18. The non-transitory computer-readable medium of claim 15, wherein the configuration parameters include one or more rules indicating how the test data is to be entered, stored, or retrieved by the lambda function.

19. The non-transitory computer-readable medium of claim 15,
wherein the one or more instructions further cause the device to obtain data from the first dedicated stream of data and the shared stream of data.

20. The non-transitory computer-readable medium of claim 15, wherein the dedicated stream of data is a private stream of data.

* * * * *